US 9,306,896 B2

(12) United States Patent
Raganath et al.

(10) Patent No.: US 9,306,896 B2
(45) Date of Patent: Apr. 5, 2016

(54) DELIVERY OF MESSAGES FOR A LIFE EVENT OF USER OF SOCIAL NETWORKING SYSTEM

(71) Applicants: Rama Raganath, San Francisco, CA (US); Jared Morgenstern, Palo Alto, CA (US); Mark Rabkin, Palo Alto, CA (US)

(72) Inventors: Rama Raganath, San Francisco, CA (US); Jared Morgenstern, Palo Alto, CA (US); Mark Rabkin, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 134 days.

(21) Appl. No.: 13/764,744

(22) Filed: Feb. 11, 2013

(65) Prior Publication Data

US 2014/0229552 A1 Aug. 14, 2014

(51) Int. Cl.
G06F 15/16 (2006.01)
H04L 12/58 (2006.01)

(52) U.S. Cl.
CPC ............... *H04L 51/32* (2013.01); *H04L 51/14* (2013.01)

(58) Field of Classification Search
CPC ............................... H04L 51/32; H04L 51/14
USPC .......................................................... 709/206
See application file for complete search history.

(56) References Cited

U.S. PATENT DOCUMENTS

| 6,081,786 | A | 6/2000 | Barry et al. |
| 7,644,019 | B2 | 1/2010 | Woda et al. |
| 7,831,439 | B1 | 11/2010 | Bryar et al. |
| 8,082,511 | B2* | 12/2011 | Sobotka ............... G06F 3/0482 715/745 |
| 8,165,562 | B2* | 4/2012 | Piett ..................... G06F 21/554 340/539.13 |
| 8,606,776 | B2* | 12/2013 | Steiner ............... G06F 17/30528 707/723 |
| 8,666,836 | B2* | 3/2014 | Adams .................. G06Q 50/01 705/26.1 |
| 8,886,153 | B2* | 11/2014 | Velusamy ............... H04W 4/22 455/345 |
| 2005/0082199 | A1* | 4/2005 | Pazdro ........................ 206/575 |
| 2008/0040673 | A1* | 2/2008 | Zuckerberg et al. .......... 715/745 |
| 2011/0179129 | A1 | 7/2011 | McKissick et al. |
| 2011/0231240 | A1 | 9/2011 | Schoen et al. |
| 2011/0276372 | A1* | 11/2011 | Spivack ............. G06Q 30/0252 705/14.5 |
| 2012/0016817 | A1 | 1/2012 | Smith et al. |
| 2012/0060105 | A1* | 3/2012 | Brown et al. .................. 715/753 |
| 2012/0109787 | A1 | 5/2012 | Larrick et al. |
| 2012/0278414 | A1* | 11/2012 | Walsh et al. .................. 709/206 |
| 2013/0103542 | A1 | 4/2013 | Abuelsaad et al. |
| 2013/0185198 | A1 | 7/2013 | Lorch |
| 2014/0059135 | A1* | 2/2014 | Stan et al. ..................... 709/204 |
| 2014/0089327 | A1 | 3/2014 | Pavlidis et al. |
| 2014/0122627 | A1* | 5/2014 | Arnold .......................... 709/206 |
| 2014/0330903 | A1* | 11/2014 | Farmer .......................... 709/204 |

* cited by examiner

*Primary Examiner* — Tauqir Hussain
(74) *Attorney, Agent, or Firm* — Fenwick & West LLP

(57) ABSTRACT

A social networking system provides suggestions of gifts to users for presentation to a target user for a life event of the target user. Merchants provide bids for their products. The social networking system selects products as gift suggestions based on the merchants' bids, recipient's interests, and the candidate user to whom the gift is suggested. The selected gift and any messages relating to the life event are held until a specified time and then delivered to the target user. At the time of delivery, the target user may be provided with alternative products that the target user can select instead of the gift. The social networking system can earn revenue based on promotion of products as gift suggestions, promotion of products as gift alternatives, and for any financial transaction related to the gift.

27 Claims, 12 Drawing Sheets

Start A Birthday Card For Your Friend

Once you started the card, other friends can join and add their own messages and photos ① Choose a friend Friends with upcoming birthdays

| Channing Cox | Heidi Sherman | Megan Guffee | Sophie Marchessou | Kristen Issaacs |
|---|---|---|---|---|
| Jun 29 | Jun 29 | Jun 30 | Jun 30 | Jun 30 |

Or choose another friend with a birthday in the next 30 days

[Type their name here...]

② Make it personal

Add a personal message

[Write something...]

Add a personal photo
Choose existing   Upload new photo

③ Start your friends birthday card

FIG. 7

③ Start your friends birthday card
Start your friends eGift card      815
810 — ○$5   ○$ [$5-$100]

Contact information

Email Address  [                    ]

820 — Credit/Debit Card

Card type        [VISA    ⇕]
Name on Card     [Michael Lage]
Card Number      [              ]
CVN              [              ]
Expiration Date  [Month ⇕] [2012 ⇕]

BILLING ADDRESS

First Name       [Michael]
Last Name        [Lage]
Street Address   [                    ]
Apt/Suit         [                    ]
City             [              ]
State/Province   [Please select a State/Province ⇕]
Zip/Postal Code  [              ]

Order Total: $5 Starbucks Card eGift for          [Create]
                                              830

FIG. 8

DELIVERY OF MESSAGES FOR A LIFE EVENT OF USER OF SOCIAL NETWORKING SYSTEM

BACKGROUND

This invention relates generally to social networking, and in particular to suggesting gift giving between users of social networking systems.

People often present gifts to their loved ones and acquaintances, including, friends, family, or colleagues on various occasions for example, birthdays, anniversaries, holidays and the like. Often, people organize events to be celebrate special occasions in which gifts for a person may be presented to that person, for example, birthday parties, baby showers, weddings, and so on. People may also make contribution to present an expensive gift that may exceed the budget of any one of the contributors. As a result, celebrating special occasions and presenting gifts can be a complex social event requiring extensive preparation and coordination between various parties.

Vendors of products and services that provide articles relevant to special occasions, for example, articles that can be presented as gifts would like to be able to promote their products and services to the various parties involved in the these special occasions. Being able to present their products to the right party at the right time could substantially increase the chances that the vendor is able to sell their products and services. Conventional promotional methods used by vendors include billboards, television broadcasts, and newspaper or magazine advertisements. However, these mass media promotional methods advertise products to a wide variety of individuals, who may or may not be interested in the products. As a result, a typical viewer of the advertisement may ignore the advertisement. Significant amount of advertising efforts of vendors gets directed towards people that do not have an immediate interest in the products services. Merchants can improve the effectiveness of their advertising by targeting it towards those individuals who are likely to be interested in, and therefore are likely to purchase, their products.

Social networking systems store social information about users, including their social profiles and social interactions. The power of social networking has not been exploited towards helping connect vendors offering various products and services to parties involved in various special occasions of people. The ability to exploit social information would allow vendors to target their advertisements and product information in a more focused manner towards parties that are more likely to purchase their products and services. Since networking systems can charge vendors for providing the appropriate social information that helps vendors sell their products, social networks can derive revenues from the vendors. Furthermore, since networking systems can provide special services benefitting users of the networking systems involved in these special occasions, users are more likely to use the networking systems, and visit the networking systems on a regular basis. This increases user loyalty towards particular networking systems that may provide these features.

SUMMARY

A social networking system delivers messages related to a life event of a target user of a social networking system. The messages may be provided by other users connected to the target user via the social networking system. The social networking system identifies a life event of the target user, for example, birthday, baby shower, or graduation. The social networking system receives a plurality of messages for delivery to the target user for the life event. Each message may be received by the social networking system at a different time. The social networking system determines a delivery time for the messages. The social networking system withholds the messages from the target user before the delivery time. Information describing the messages may be sent to other users of the social networking system before the delivery time even though it is withheld from the target user. Upon reaching the delivery time for the life event, the messages are delivered to the target user.

In an embodiment, the social networking system determines the delivery time based on feedback from other users connected to the target user. For example, the social networking system sends a proposed delivery time to one or more users connected to the target user. The target user may provide feedback indicating whether they like proposed delivery time. If more than a threshold users indicate a dislike for the proposed delivery time, the social networking system may propose a new time or request the users to suggest a delivery time.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 7 shows a screenshot of a user interface for allowing friends of a user to initiate a group gift card for a life event of the user, in accordance with an embodiment of the invention.

FIG. 8 shows a screenshot of a user interface for allowing friends of the target user to contribute to a group gift, in accordance with an embodiment of the invention.

Figure 1:
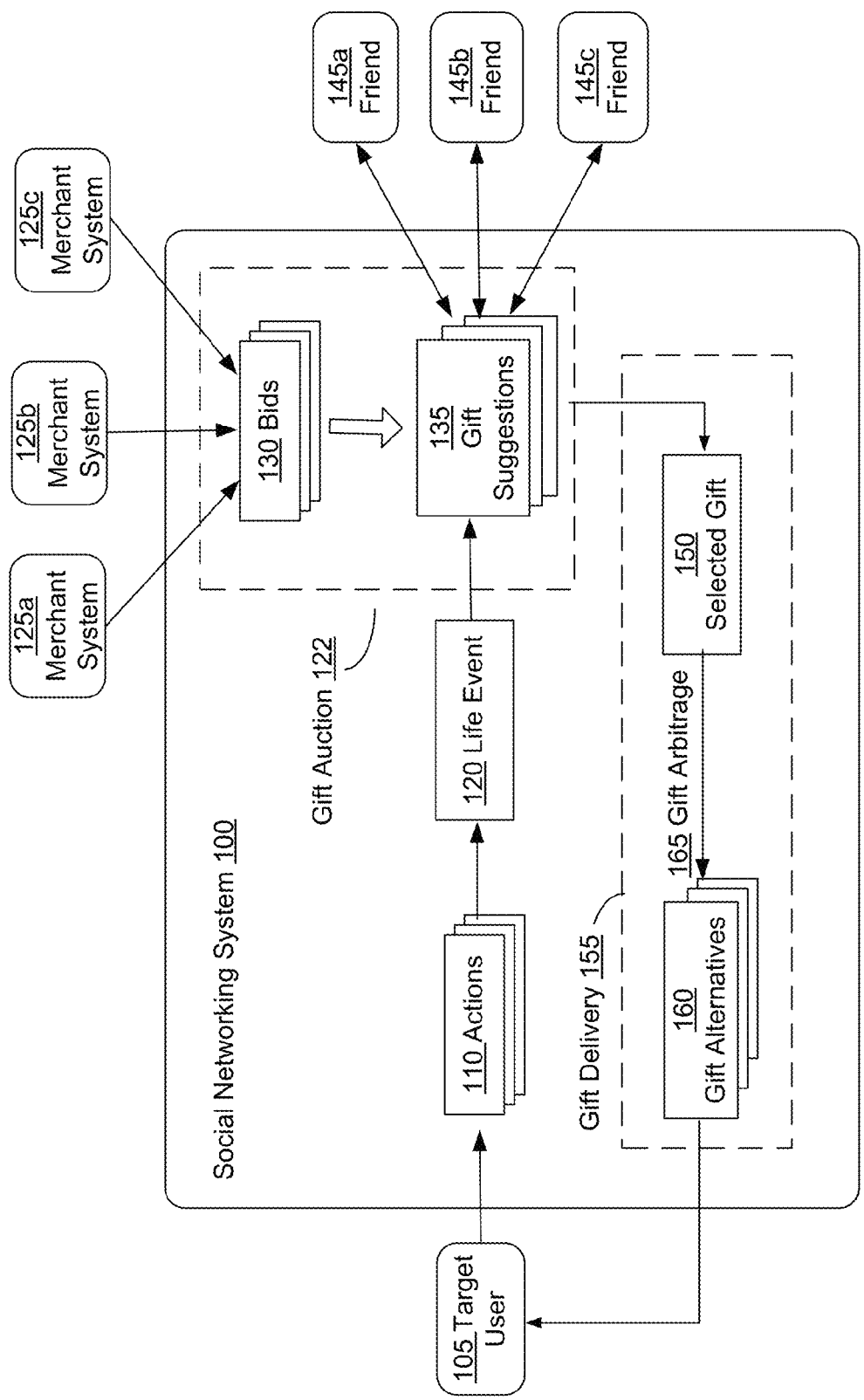
FIG. 1 is a diagram of the system environment illustrating a social networking system allowing connections of a user to present gifts to the user, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Social networking systems store information describing users of the social networking system and their interactions with each other. Users join the social networking system and then add connections to a number of other users to whom they desire to be connected. The social networking system may be aware of important events in the lives of its users, such as birthdays, weddings, or anniversaries. When the social networking system presents information regarding a user's life event to that user's connections in the social networking system by explicit postings, news feed, or other means, the user's connections often respond in a generic manner, for example, by sending messages of congratulations or well-wishing. However, some users may desire to respond to another user's life event in a manner more befitting the nature of the event and the affinity of the other user. In particular, a user might prefer to give a gift to another user rather than merely send a message. The type of gift presented may depend on the type of event, interests of the user receiving the gift, and the closeness of the user presenting the gift and the recipient. In particular, when a user of a social networking system has an upcoming life event that might warrant gift giving from other individuals, such as a birthday, wedding, baby shower, graduation, or the like, the social networking system may send gift suggestions to the connections of that user particular products that may be given as gifts. If the social networking system presents a user with products or services as potential gifts that would be appropriate for the life event and likely to be interesting to the receiver of the gift, the user is more likely to purchase the products or services presented to the user.

Various products and services to be presented as gifts may be provided by merchants wishing to advertise their products in a manner beneficial both to the users of the social networking system and to the promotional goals of the merchants. A reference to the term "product" is not limited to physical goods but includes various types of products and services, charity donations, gift cards, memberships of organizations, tickets to events, media including music, videos, movies, and the like. Social networking systems can utilize social information to suggest potential gifts to connections of a target user for presenting to the target user. The suggestions for gifts can be determined based on various factors including information describing the target user, information describing the connections presented with the gift suggestions, and the amount of revenue that the social networking system generates.

The social networking system can also use social information of the target user and the special occasion to determine how the gift is delivered to the target user. For example, the social networking system may determine that the gift or message is delivered at a particular time based on the type of occasion. The time selected for delivery of the messages and gifts is typically closer to the special event or occasion. For example, if the special occasion is the birthday of the target user, birthday greetings sent by the connections of the user may not be delivered when the connection sends the message. Instead, the social networking system may hold all messages to be delivered and deliver them at midnight on the birthday.

In spite of the social information utilized by the social networking system in selecting gifts for the target user, there is a likelihood that the target user would have preferred another gift instead of the gift actually selected by a connection of the target user. The social networking system may present the target user with alternatives to the gift along with the gift selected by the connections of the user. These alternatives are products and or services that were not selected by the connection. However, the social networking system determines that the target user may be interested in preferring these gifts instead of the gift actually selected by a connection. If the target user prefers an alternative, the social networking system may generate higher revenue based on the transaction instead of a transaction based on the gift originally selected by the connection. The revenue generated by the social networking system depends on a difference of price that the connection of the target user selected and the gift that was finally selected by the target user. This process of presenting alternative gifts to users and generating revenue based on the price difference between the gift selected by the connection and the gift selected by the target users is referred to as gift arbitrage herein.

These embodiments allow the social networking system provides vendors with opportunities to present product information to users at various occasions when the user is very likely to complete a transaction associated with the product and services. Furthermore, the social networking system maximizes the revenue generated by the social networking system as a result of the transactions. Furthermore, the social networking system provides valuable service to the users of the social networking system, thereby increasing user loyalty.

System Environment

FIG. 1 is a diagram of the system environment illustrating a social networking system allowing connections of a user to present gifts to the user. FIG. 1, illustrates interactions between the social networking system 100, users 105, 145 of the social networking system, and merchants 125. Figure (FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures). In an embodiment, the social networking system 100 is implemented using a computer system. The users including the target user 105 and friends 145 communicate with the social networking system using computer systems, for example, client devices. The merchant system 125 may also be implemented using a computer system.

A social networking system 100 offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user selecting a particular other user to be a friend, or automatically created by the social networking site based on common characteristics of the users (e.g., users who are alumni of the same educational institution). Connections in social networking system are usually in both directions, but need not be, so the terms "user" and "friend" depend on the frame of reference. For example, if Bob and Joe are both users and connected to each other in the social networking system, Bob and Joe, both users, are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

The social networking system provides users 105, 145 with the ability to take actions on various types of items supported by the social networking system. These items may include groups or networks (where "networks" here refer not to physical communication networks, but rather to social networks of people) to which users of the social networking system may belong, events or calendar entries in which a user might be interested, computer-based applications that a user may use via the social networking system, and transactions that allow users to buy, sell, auction, rent, or exchange items via the social networking system. These are just a few examples of the items upon which a user may act on a social networking system, and many others are possible.

Users 105, 145 of the social networking system perform other actions 110 including, posting information, visiting pages, interacting with the information posted by other users, and executing transactions related to products offered by merchants 125. Social networking system 100 can use the actions 110 of a target user 105, to determine information describing life events 120. A life event can be a significant event in the target user's life based on a special occasion. A user may explicitly define these dates, for example, the user's birthday, wedding, or graduation. The social networking system 100 can also infer information regarding life events not explicitly specified by a user, for example, a pet adoption. The social networking system can infer life events from actions 110 performed by the target user using the social networking system 100, for example, communications with connections referring to the event. The social networking system can also determine life events based on information obtained from external systems interacting with the social networking system, for example, an external gift registry tat interacts with the social networking system using social network plug-ins.

Merchant systems 125 are computer systems that allow vendor organizations to interact with computer systems of other organizations, for example, a computer system of a social networking system 100. Merchant systems 125 provide social networking system 100 with bids 130 associated with products that can be potentially presented to users as gifts. In the description herein, a merchant system can also be referred to as a merchant or a vendor. Bids may be represented in the social networking system as objects or data structures storing information describing the bids. Information describing a bid 130 includes information identifying a product that could be given as a gift and the price of the item, for example, the price that a user needs to pay to purchase the item. In addition, bids 130 may describe a portion of revenue share to be given to social networking system 100 in the case a transaction based on the product is executed by a user with the merchant. A bid may also include revenue provided to the social networking system if the social networking system presents the product information to a user, for example, as a gift suggestion or during the gift arbitrage.

The social networking system 100 uses the bids 130 and actions 110 of the target user 105 to provide gift suggestions 135 to friends 145 of the target user 105. The interests of target user 105 and friends 145 may be inferred from actions 110 of the target user 105 and the target user's friends 145. The social networking system 100 determines a set of gift suggestions 135 based on information describing the target user 105, the life event 120, the friends 145, and the bids 130.

Social networking system 100 informs friends 145 that target user 105 has an upcoming life event 120 and gives friends 145 the opportunity to respond to the event. The social networking system 100 presents gift suggestions to the friends 145 of the user. A friend 145 or friends 145 may select one or more gifts 150 to present to the target user 105 from the set of suggested gifts 135. In an embodiment a group of friends may collectively present a gift to the user by making contributions to the gift. In this situation, a single gift (referred to herein as a "group gift") may be purchased by a pool into which multiple individuals contribute.

In the case of a group gift, selected gift 150 may be determined by social networking system 100 based on the feedback of friends 145, for example, via a voting process. Selected gift 150 is then delivered 155 to target user 105 at the time of the life event or at a time related to the life event, for example, before the life event. In one embodiment, gift delivery 155 comprises gift arbitrage 265. During arbitrage, gift alternatives 160 are presented to target user 105 along with the selected gift 150. Target user 105 may select one of gift alternatives 160 to replace the selected gift 150 if the target user 105 would prefer one of the alternatives over the selected gift.

System Architecture

Figure 2:
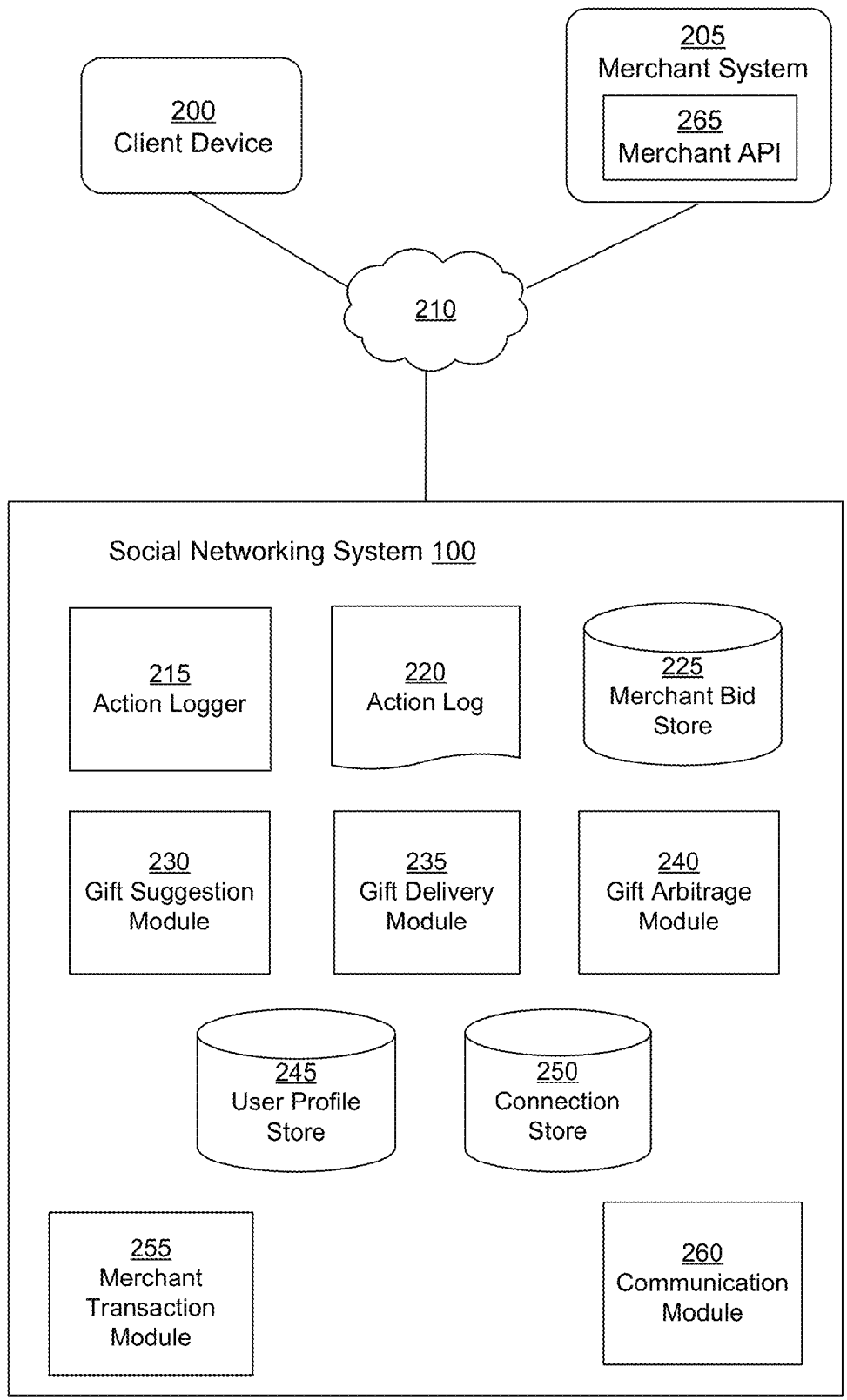
FIG. 2 is a high-level block diagram of the system architecture of a social networking system for facilitating connections of a user to present gifts to the user, in accordance with an embodiment of the invention.

FIG. 2 is a high-level block diagram of the system architecture of a social networking system for facilitating connections of a user to present gifts to the user, in accordance with an embodiment of the invention. The system architecture may be configured as computer-executable program modules. As used herein, the term "module" refers to computer program logic and/or data for providing the specific functionality. A module can be implemented in hardware, firmware, and/or software. The social networking system 100 includes an action logger 215, action log 220, merchant bid store 225, gift suggestion module 230, gift delivery module 235, gift arbitrage module 240, user profile store 245, connection store 250, merchant transaction module 255, and communication module 260. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

Client device 200 interacts with social networking system 100 through network 210. Network 210 represents a communication pathway between user device 200, merchant system 205, and social networking system 100. The network 210 is typically the Internet, but may be any network, including but not limited to a LAN, a MAN, a WAN, a mobile wired or wireless network, a private network, or a virtual private network. In one embodiment, the network 210 uses standard communications technologies and/or protocols. For example, the networking protocols used on the network 210 can include the transmission control protocol/Internet protocol (TCP/IP), the hypertext transport protocol (HTTP), the file transfer protocol (FTP), etc. The data exchanged over the network 210 can be represented using technologies and/or formats including the hypertext markup language (HTML), the extensible markup language (XML), etc. In some embodiments, the entities can use custom and/or dedicated data communications technologies instead of, or in addition to, the ones described above.

The client device 200 can be a desktop computer, laptop computer, portable computer, personal digital assistant (PDA), smart phone, or any other device including computing functionality and data communication capabilities. A plurality of client devices 200 can be configured to communicate via the network 210. Furthermore, although only one client device is shown in FIG. 2 for simplicity, it is to be understood that a plurality of client devices may interact with social networking system 100.

Action logger 220 identifies interactions of users with social networking system 100 and logs the information in action log 215. User interactions with social networking systems include interactions between users, interactions between a user and a page within the social networking system, interactions between a user and a post on a page, and user visits to or interactions with a page outside the social networking system that contains plug-ins for that social networking system. When a user manually enters information into the user's profile, for example, name, location, sex, age, and date of birth, the information is stored in the user profile store 245.

Communication module 260 provides various methods for users to communicate, including but not limited to wall posts, news feed, emails, or customized user interfaces such as side bars or fly-outs. The connection store 250, stores information relating to the social connections of each user such as a list of social connections, list of connections shared with each connection, and frequency and type of interactions between the user and each connection. The communications between the target user and the target user's connections may be stored in the connection store 250 or in a different data store.

For one given user, the information stored in action log 215, user profile store 245, and connection store 250 may be used to accurately predict characteristics of that user. Methods that might be used to predict user characteristics are well known in the art. For example, the user might frequently respond to pictures, articles, and comments relating to dogs. The frequency and nature of these responses would likely indicate that the user is interested in dogs and, therefore, might be interested in dog-related merchandise or services. However, any number of methods may be used to predict, infer, or deduce user characteristics and interests, and the present invention is not limited by the particular method employed.

Merchant system 205 also interacts with social networking system 100 through a network 210, which may be in the same form as or in a different form than the network through which user device 200 interacts with social networking system 100. Within social networking system 100, merchant transaction module 255 connects the social networking system 100 to a merchant application programming interface (API) 265 to complete gift transactions. In one embodiment, the merchant API 265 may be implemented as a web service. The merchant APIs 265 allow the social networking system 100 to send requests for information to the merchant system 205 and receive information associated with bids 130.

The gift suggestion module 230, gift delivery module 235, and gift arbitrage module 240 perform processing related to gifts. The gift suggestion module 230 collects merchant bids for products that may be sold through the social networking system and facilitates the purchase of these products as gifts that may be given from one user to another. As friends respond to the life event of target user 105, the gift delivery module 235 collects the gift chosen by users, informs other users of the gift, encourages participation, and delivers the gift at a specified time to the target user. In addition to delivering the gift chosen by users, gift delivery module 235 may invoke gift arbitrage module 240 to provide the target user with alternative gift options. These alternative gifts may be chosen in place of the original gift, with the tradeoff that the alternatives may have lower value than the original gift. Gift suggestion module 230, gift delivery module 235, and gift arbitrage module 240 are described in further detail herein.

Gift Suggestion

The social networking system 100 receives from merchants, bids for product(s) that can be potential gifts presented by users of the social networking system 100 to other users. The merchant transaction module 255 stores information about the bid in merchant bid store 370 including the merchant information, product information, and bid_value. In an embodiment, the merchant bid store 370 represents the bid information as a record or tuple <merchant_id, product_id, bid_value>, where the merchanid_id represents an identifier of a merchant, the product_id represents an identifier of the product, and the bid_value is a representation of the bid value. In this representation, the merchant and product information may be stored in a separate store or a database table, where the merchant_id and product_id values are foreign keys referring to these stores or database tables respectively. The bid value could be in the form of an absolute monetary value or a percentage of the product value. The bid value represents the revenue provided to the social networking system 100 by the merchant for services provided by the social networking system to the merchant towards selling of products of the merchants to users.

The revenue provided by the merchant to the social networking system 100 by the merchants may depend on the value of the product for which the bid is placed, for example, as a percentage of the price of the product. The value of the revenue provided to the social networking system may be a fixed price, for example, a fixed amount paid by the merchant to the social networking system 100 for every impression of the product presented to a user. The value of the revenue provided to the social networking system 100 may represent an amount paid to the social networking system responsive to a product being sold as a gift to the target user responsive to the social networking system suggesting the product as potential gift to the friends of the target user. The value of the revenue provided to the social networking system 100 may depend on the context in which the product information is presented by the social networking system 100 to the user, for example, the value of the revenue for presenting the product to the target user during gift arbitrage may be higher than the value of the revenue for presenting as a gift suggestion to a connection of the user. This is so, because the likelihood of the product being sold during gift arbitrage are determined by the social networking system to be higher than the likelihood of the product being sold based upon a gift suggestion.

In an embodiment, the social networking system 100 receives multiple bids from the merchant for the same product, each bid corresponding to the revenue provided to the social networking system for a particular type of action performed by the social networking system towards the promotion of the product. Separate bid values may be provided for different actions taken by the social networking system including, recommending the product as a gift suggestion to a connection of the user, presenting the product as an alternative for the gift finally selected for the user, a financial transaction executed as a result of the product being given as a gift to the user, and recommending the product as a gift suggestion to a subsequent user after the product has already been recommended to at least one connection of the user. The bid value provided by the merchant for recommending the product as a gift suggestion to a connection of the user is typically less than the bid value provided for presenting the product as an alternative for the gift finally selected for the user. The bid value provided by the merchant for recommending the product as a gift suggestion for the first time for this life event of the target user to a connection is higher than the bid value for recommending the product as gift suggestions to subsequent users after the product has already been suggested to at least one connection. In an embodiment, the social networking system verifies these relations between different types of bid values for the same product provided by a merchant and may provide a warning or a message to the merchant responsive to the bid values not conforming to an expected relationship.

Figure 3:
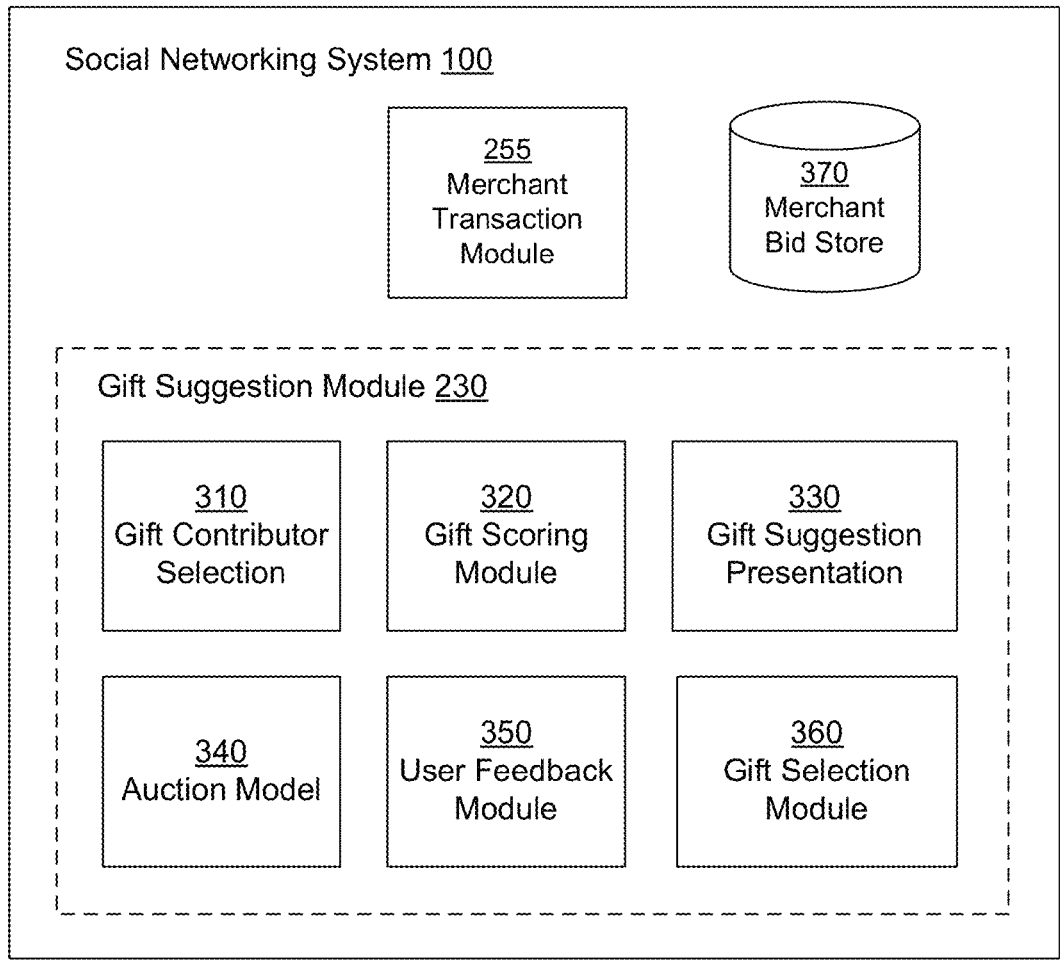
FIG. 3 provides details of the gift selection module, in accordance with an embodiment of the invention.

FIG. 3 outlines the components of one embodiment of gift suggestion module 230. After merchant transaction module 255 collects a plurality of merchant bids 130, gift suggestion module 230 selects products from the set of merchant bids that may be given as gifts and selects social connections of the target user to encourage to purchase the gift suggestions. More precisely, gift suggestion module 230 as shown in FIG. 3 contains a number of sub-modules that select social connections to target as potential gift givers, choose gift options from the set of merchant bids 130, present the suggested gifts to the selected social connections, receive feedback from the social connections to whom the suggestions are presented, and select a gift for the target user.

Gift contributor selection 310 selects users of the social networking system that are likely to give the target user gifts in response to his or her life event. The selected users are referred to herein as "friends," but it is to be understood that these connections can include individuals with any relationship to the target user and are not limited by the terminology used to designate connections. The entire set of social connections of the target user may be selected as potential gift givers also referred to as gift contributors. In an embodiment, the selected group of gift contributors may be a subset of the target user's social connections. Selection of gift contributors may be based on user affinity, recent interactions between a connection and the target user, a rate at which the connections have given gift to the target user in the past, or other criteria. The gift contributor selection 310 may select individual gift contributors, such that each individual gift gives a separate gift to the target user and the number of gifts given to the target user is equal to the number of gift contributors. If the price of a potential gift exceeds a threshold value, the gift contributor selection 310 may select multiple friends to present the product as a group gift. In this situation, each contributor of the group gift contributes less than the price of the gift, for example, if there are three contributors, each contributor may contribute a third of the price of the gift. In this case, the number of gifts given to the target user is less than the number of friends who purchase gifts. Alternatively, the selected gift contributors can be a combination of individual gift contributors and group gift contributors.

Each product provided by the set of merchant bids 130 is assigned an interest score by gift scoring module 320, the score representing the likelihood of a friend selecting a particular product to give as a gift to the target user. Each interest score is assigned based on such factors as the interests of the target user, qualities of the friends such as their personal interests, interests shared with the target user, and expected monetary contribution; or the appropriateness of the gift for the life event. For example, if the life event is a baby shower, gifts relating to babies may receive a higher interest score than restaurant gift certificates or baseball tickets. As another example, if friend A frequently visits restaurants with the target user, a restaurant gift certificate may receive a high interest score for friend A. The social networking system 100 may use information provided by users when they check-in to a location to identify the various places visited by the user, for example, restaurants, stores, malls, and the like. In this case, the product is scored based on a particular gift/friend combination; the same product, i.e., the gift certificate for the same restaurant, may receive a lower interest score for a different friend who has not been identified as frequenting that particular restaurant with the target user.

In one embodiment, a product receives a high interest score if the product is on a wish list of the target user. The wish list may identify products in which the target user is interested, based on the target user or connections of the target user adding products to the wish list. A method for generating a wish list for a target user is described in U.S. patent application Ser. No. 13/748,222, filed Jan. 23, 2013, which is incorporated by reference in its entirety.

In an embodiment, the social networking system selects a gift for recommending to a candidate user based on the economic status of the candidate user. The economic status may be determined based on information available in the user profile of the candidate user, for example, earnings or type of job specified by the user. A candidate user having higher earning capacity may be provided with gift suggestions of more expensive products compared to a candidate user having lower earning capacity. Similarly, the social networking system considers the economic status of the target user receiving the gift to select potential gifts for the target user. If the economic status of the target user indicates that the target user belongs to a high economic status, the social networking system selects more expensive gifts for the target user compared to another user with lower economic status.

In an embodiment, the selection of gifts is based on the type of life event. For example, gifts given for a birthday event are different from gifts given on a wedding. Similarly, gifts given for a graduation may be different for gifts given for a birthday or a wedding. In an embodiment, the gift suggestion module 230 maintains an association between types of life events and the types of gifts typically presented for that type of life event. These associations may be predetermined by experts and stored in the social networking system 100. In an embodiment, the social networking system may build a database of these associations based on observations of gifts presented by users of the social networking system to other users. For example, is a friend uses the social networking system presents a gift to a friend via the social networking system user interface close to a life event of the friend, that product is added as a type of product that is likely to be provided as gift for that type of life event. Over time, if the same type of product is given as gift on various occasions, the social networking system 100 associates that type of product as potential gift for that type of life event. The products associated with a type of life event may be identified by the brand name, the type of item, for example, a toy, dress, book, etc. or by a unique identifier for the product type. In an embodiment, the social networking system determines a common set of characteristics of a set of products previously presented as gift to users so as to be able to associate a new product provided by a vendor with a particular life event. In subsequent instances of that type of life events, the social networking system may identify products of the type associated with the life event and suggest them as potential gifts to friends of the target user. This mechanism allows the social networking system to grow the database of associations of gifts with types of life events.

The bids 130 are also assigned a revenue score by auction model 340, which predicts the expected revenue of the social networking system contributed by each bid based on the value of the bid and the interest score determined by gift scoring module 320. Gifts that are most likely to be purchased by a friend or friends and that have the greatest revenue share for the social networking system would be given the highest revenue score by auction model 340.

In an embodiment, the gift suggestion module determines a combined weighted score for each bid based on various criteria, for example, the interest score and the revenue score. After the bids have been assigned the relevant scores, gift suggestion presentation module 330 presents the bids to the selected friends based on the scores. For example, a product associated with a bid having higher score has greater likelihood of being presented to friends of the target user. All friends may see the same selection of gift options, or the options may be tailored to the specific friend (such as in the restaurant gift certificate example above, in which a particular gift/friend combination received a high interest score). Presentation of gift options may employ methods commonly used within social networking system 100 to present information its users, such as wall posts or newsfeed, or may use a custom interface such as a sidebar gift user interface. Gift suggestion presentation module 330 also determines the time to present gift options to the friends that may be on the day of the life event or a set time period prior to the life event that would allow friends sufficient time to respond to the event and decide to purchase or contribute towards a gift.

After the options have been presented by gift suggestion presentation module 330, user feedback module 350 solicits feedback from the friends regarding the available gift options. Feedback can be in the form of user comments, user "liking," or other methods that similarly quantify the response of friends to the product type, price, appropriateness for the life event, or other factors. In one embodiment, friend feedback may be passed to gift selection module 360, described further below, to determine the gift to be given to the target user. In another embodiment, the feedback provided by friends can be used to adjust the interest score that was assigned to the gift by the gift scoring module 320. The gift scoring module may in turn adjust the revenue score based on the adjustment of the interest score.

The gift selection module 360 selects one or more gifts at a specified point relating to the life event. Selection may occur in a number of ways. If friends provide individual gifts, each friend selects a gift to give to the target user for the target user's life event and pays for the entire cost of the gift. The gift selection module may also modify the gift options available to other friends based on the purchase of one gift. For example, if item A was presented to both friend B and friend C as a gift option, and friend B purchases item A, item A may be removed from the set of gift options presented to friend C.

Alternatively, if a plurality of friends gives a group gift, gift selection module 360 selects the gift to be given to the target user based on the feedback received by user feedback module 350. In one embodiment, when the group gift is a gift card or other redeemable certificate that can be purchased in continuous monetary values, the money contributed by friends can be directly applied to the value of the gift. Gift selection module 360 may then compute the value of the gift based on the total amount of money contributed by friends. For example, friends A, B, and C contribute money to purchase a gift card for target user D's birthday. Friend A donates $20.00, friend B donates $7.00, and friend C donates $13.43. Gift selection module 360 then computes that target user D may receive a gift card with a value of $40.43.

In another possible case of a group gift, the group gift may have a fixed price. Examples of such gifts include products or gift cards that may only be purchased in discrete increments. For example, friends A, B, and C contribute money to purchase a gift with a fixed cost of $45.00. If friend A contributes $20.00, friend B contributes $7.00, friend C contributes $13.43, and no other social connections of the target user contribute to the gift, the funds will be insufficient to purchase the $45.00 gift. In such a case gift selection module 360 may encourage one or more of the friends to increase his or her contribution to cover the difference in cost. Alternatively, gift selection module 360 may select an alternative gift that can be purchased with the available funds. The alternative may be one of the previously-suggested gift options that was ranked slightly lower by users in user feedback module 350 than the originally-selected gift. In an ideal embodiment, gift selection module 360 selects the gift with the highest user feedback rank that can be purchased with the money contributed by the plurality of friends. In an alternative case, friends contribute more money than is needed for the originally-selected gift. For example, friend A contributes $20.00, friend B contributes $7.00, and friend C contributes $10.00 to be used to purchase a $45.00 gift. If the quantity contributed is sufficient to purchase a more expensive gift from the available options, gift selection module 360 may select the more expensive gift to be given to the target user. If the contributed money is not used to purchase a more expensive gift, the difference between the quantity donated and the cost of the gift may be transferred to the social networking system.

Figure 4:
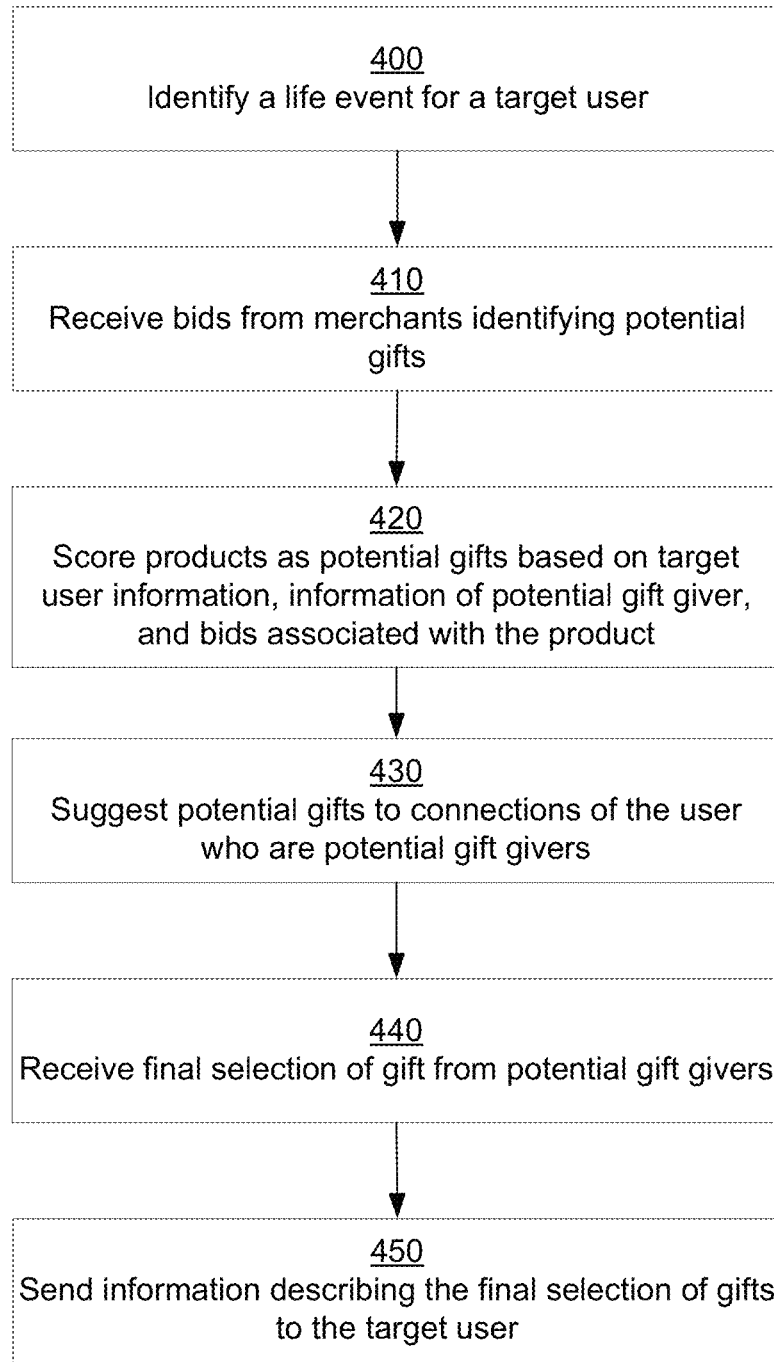
FIG. 4 is a flowchart of the gift selection process, in accordance with an embodiment of the invention.

FIG. 4 is a flowchart outlining the process of one embodiment of the gift suggestion module 222 as detailed in the description of its sub-modules. The social networking system 100 identifies 400 a life event 120 of a target user 105. The social networking system 100 receives 410 bids 130 from merchants 125 identifying products that may be gifted to target user 105 for his or her life event 120. The social networking system 100 scores 420 the products as potential gifts based on various criteria including information describing the target user, information describing a connection of the target user who is a potential gift giver, and a bid associated with the product, for example, the bid specifying revenue provided to the social networking system for promoting the products as potential gifts. The score of the products may be based on other criteria including the interests of target user 105 and friends 145, socioeconomic status of friends 145, or nature of life event 120. The gift selection module 360 uses the score of the potential gifts to select the products that are recommended to the potential gift givers. The gift suggestion module 230 suggests 430 the selected gifts to the potential gift givers. The potential gift givers provide their final selection of the gifts that they would like to present to the target user. The gift delivery module 235 sends 450 information describing the final selection of gifts for the target user to the target user at a time close to the life event, for example, at midnight on the day of a birthday of the target user.

Gift Delivery

Figure 5:
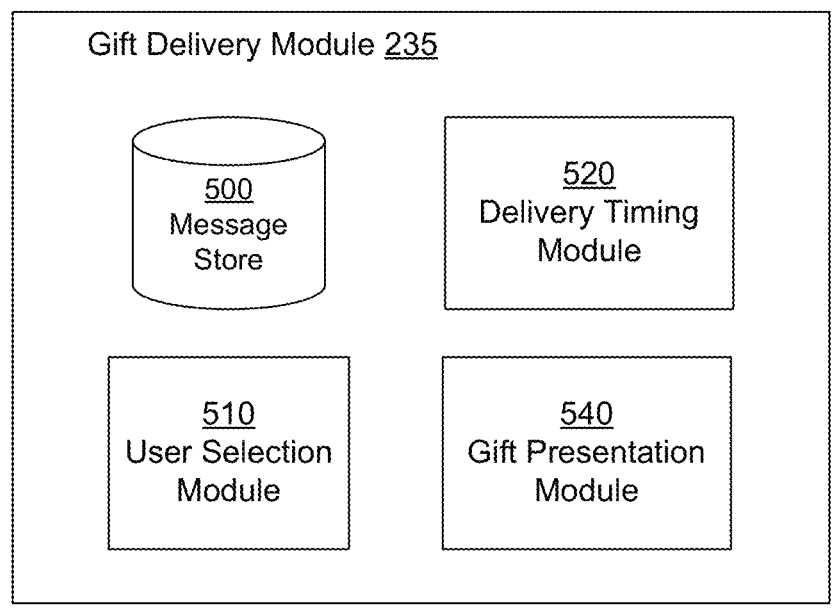
FIG. 5 provides details of the gift delivery module, in accordance with an embodiment of the invention.

FIG. 5 details the components of one embodiment of gift delivery module 235. In response to a life event 120, friends 145 send messages to target user 105, or social networking system 100 sends messages to target user 105 based on the actions of friends 145 within the system. These messages include communications, for example, comments or emails from friends with greetings, well-wishes, or other types of statements for the life event and notification of gifts purchased by friends 145, whether these gifts are purchased by individual friends or by groups of friends 145.

As messages are sent, some users of social networking system 100 may be permitted to view information regarding the messages. For example, a user may be able to see on the morning of a given day that it is target user A's birthday and that three friends so far have donated money to purchase a gift for target user A, whereas target user A may not be notified of that information. Such selection of users who can see information regarding messages is performed by user selection module 510. Generally, user selection module 510 determines which users of social networking system 100 should be able to see information related to a gift or gifts for a particular target user's life event. Visible information is that which a user of social networking system 100 can access under normal operation of the social networking system, that is, information saved to and/or displayed upon the user's profile, information posted to the user's newsfeed, messages sent to the user, or publically-available information. It does not include, for example, information that could be accessed by logging into another user's profile.

According to one embodiment, the social networking system informs some or all social connections of target user 105 that other connections are contributing money to purchase a gift for target user 105 or sending public comments to target user 105. In an embodiment, the messages communicated to the target user and the information describing the gifts for the life events is communicated to the users based on the privacy settings of the target user and the privacy settings of the other user that is communicating the message or sending the gift. However, the social networking system ensures that the same information is not communicated to target user 105 until a predetermined time based on the life event. In another embodiment, said gift information is displayed only to the plurality of individuals selected by social networking system 100 to give a group gift.

Messages may be sent by friends 145 to target user 105 at any point before the life event, or within a designated window before the life event such as the time specified by gift suggestion presentation module 330, but are initially held in message store 500 instead of being delivered directly to target user 105. These messages are not provided to the target user 105, even if the target user attempts to access the message store with proper authentication until a predetermined time based on the life event. In an embodiment, the message store 500 is a channel dedicated to a particular target user and particular life event of said target user. Delivery timing module 520 determines an appropriate time to deliver the messages held in message store 500 to target user 105, such as the time of the life event or a predetermined time on the date of the life event, such as 9:00 pm. Delivery timing may be based on the type of life event. For example, the delivery timing for a birthday may be determined to be at midnight when the birthday start or soon after midnight. For certain life events the delivery time may be during the day of the life event, for example, in the morning. The delivery time may be determined based on the target user. For example, the messages may be delivered on the day of the life event after the target user logs in to the social networking system. If the target user doesn't log into the social networking system on the day of the life event until very late during the day, the messages may be delivered at a predetermined time before the target user logs in. The delivery time for a life event corresponding to a graduation may be based on the time associated with a graduation ceremony. In an embodiment, the social networking system 100 communicates with the friends of the target user that are sending messages and gifts to the target user to determine a time of delivery. For example, the time of delivery may be presented to one or more of these friends of the target user and if more than a threshold number of friends dislike the proposed delivery time, the friends may be provided a user interface to suggest a new delivery time or the social networking system may proposed a new delivery time. For example, the delivery time for a baby shower may be determined based on information received from the friends of the target user participating in the baby shower.

When the time specified by delivery timing module 520 is reached, gift presentation module 540 delivers messages stored in message store 500 to target user 145 by communication mechanisms used by the social networking system, for example, wall posts, email notifications, private messages, and the like. In an embodiment, these messages are displayed to the user in a separate portion of the user interface, for example, a portion specially dedicated to information related to the life event. In one embodiment of the design, the presentation module determines the order in which messages will be delivered to target user 105 based on some factor such as the affinity between the sender of each message and the target user, or the time the gift was purchased or otherwise prepared. In another embodiment, the gift presentation module 540 categorizes messages for delivery, enabling for example messages from family members to be delivered together, or messages from classmates or coworkers to be delivered together.

The method of message delivery depends on the type of message. Messages such as wall posts, private communication between users, or other text-exclusive content may be delivered by displaying the text directly or providing a link to a page containing the text. Messages comprising gift information may be delivered, in one embodiment, by the gift presentation module 540 transferring target user 105 to the API of the relevant merchant through a specialized channel. In another possible embodiment, the gift presentation module 540 comprises a custom gift redemption platform, such that target user 105 may redeem his or her gift without interacting with the merchant API.

The gift redemption process is specific to the nature of the selected gift. Generally, target user 105 is given credit for the gift, wherein credit might be a printable certificate or coupon, a downloadable file, a secret code that may be entered at an external website, a certificate or coupon that may be downloaded to a mobile device, confirmation that the item will be shipped or mailed to the target user, access to a debitable account, credit transferred to a personal online fund repository such as a bank account, PayPal® account, or the like, or any other method that may be relevant for delivering the selected gift. For example, if the gift is a gift card that may be redeemed by an online merchant, the user may be provided with a code that could be entered at check out when the target user purchases an item. Alternatively, if the gift is a physical product that must be mailed or shipped to the target user, target user 105 may be asked to enter a shipping address that merchant transaction module 255 sends to the merchant in addition to the purchase request and payment or payment agreement. In yet another embodiment, the target user may be given an opportunity to select a particular gift out of a set of similar options. For example, if the gift is a candle that comes in six different scents, the target user may be able to select the scent of the candle.

Figure 6:
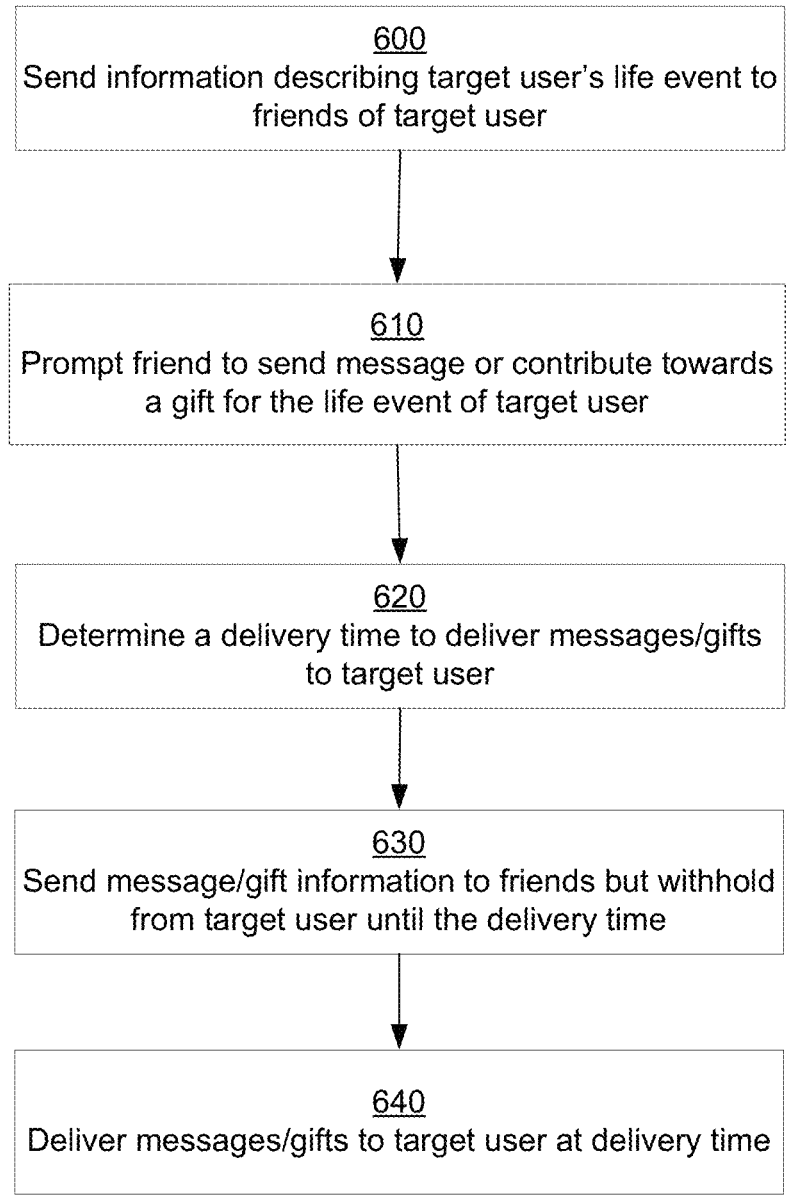
FIG. 6 is a flowchart describing the gift delivery process, in accordance with an embodiment of the invention.

FIG. 6 is a flowchart outlining the procedure employed by one embodiment of gift delivery module 235, for delivering messages and information describing a gift presented to the user for the life event. The social networking system 100 sends 600 information describing the life event of the target user to friends of the target user 105. In an embodiment, the social networking system 100 may prompt 610 the friend 145 to send a message to the target user for the life event, for example, a greeting, and/or purchase a gift or contribute money towards a gift for the target user, in combination with contributions by other friends towards a gift. Delivery timing module 520 determines 620 a delivery time for the life event of the target user 105 for delivering all messages related to the life events send by friends 145 and information describing any gifts presented for the life event.

As friends 145 respond to the life event 120 of target user 105, message store 500 collects all messages, including notification to the target user of gifts or money contributed towards group gifts as well as notes written by friends 145 to target user 105. User selection module 510 sends 630 the information of some or all of the contents of message store 500 to the users selected by the module.

At the delivery time specified by delivery timing module 520, gift selection module 360 determines the gift or gifts to be given to target user 105 based on the response of friends 145, including their feedback to gift suggestions 135 and the money they contribute to a gift. The gift presentation module 540 may sort the gifts into categories based on the relationship between friends 145 and target user 105. The gift presentation module 540 sends 560 the messages and information describing the gift(s) to target user 105 at the delivery time. The gift presentation module 540 may then facilitate gift redemption.

In one embodiment of the gift delivery module 235, the gift(s) chosen by friends 145 or by gift selection module 360 based on the input of friends 145 is/are delivered to target user 105 as described above. In another possible embodiment, target user 105 may be given the opportunity to select an alternative gift instead of the gifts actually selected by the friends of the target user. Arbitrage module 240 presents the gift alternatives and the gift selected by friends to target user 145 and facilitates arbitrage. Details of arbitrage module 240 are provided herein.

FIG. 7 shows a screenshot of a user interface for allowing friends of a user to initiate a group gift card for a life event of the user, in accordance with an embodiment of the invention. The user interface provides required instructions 710 for the user to initiate the group gift card. As shown in FIG. 7, a user of the social networking system is presented with one or more friends that have a life event within a near future. FIG. 7 shows a list of friends 720 of the user that have upcoming birthdays. However, other embodiments can show different life events of users, for example, graduation, wedding anniversary, and the like. The user may be provided a mechanism to personalize the group gift card by adding a message 730. The user may be allowed to include additional content to personalize the group gift card, for example, by including an image 740 along with the message.

FIG. 8 shows a screenshot of a user interface for allowing friends of the target user to contribute to a group gift, in accordance with an embodiment of the invention. The user can contribute monetarily towards a gift, for example, by making a payment 820 using a credit card. The user interface shown in FIG. 8 prompts the user with an amount 810 to contribute towards the gift or to enter a new amount 830. Once the user has provided the requested information the user can initiate the group gift card by clicking on a button 830. Similar user interface can be presented to other friends of the user to contribute towards one or more gifts.

Figure 9:
FIG. 9 shows a screenshot of a user interface for informing friends of the target user that one of the friends has started a group gift card, in accordance with an embodiment of the invention.

Once a friend of the target user initiates a group gift card for the target user, other friends of the target user may be provided with an opportunity to contribute to the group gift card either by adding new messages or making a monetary contribution. FIG. 9 shows a screenshot of a user interface for informing friends of the target user that one of the friends has started a group gift card, in accordance with an embodiment of the invention. Information 910 describing the group gift card may be provided as part of communication channels of the social networking system, for example, newsfeed. In other embodiments the information may be presented to the friends using a user interface specialized for presenting group gift information, for example, a panel or side bar of a webpage. The friends of the user may be presented with information describing the activities related to the group gift card performed by other users so far, for example, information describing the users that added messages to the group gift card, information describing the users that made financial contributions to the group gift card, information describing any gift that has been finalized in the group gift card, and so on.

Figure 10:
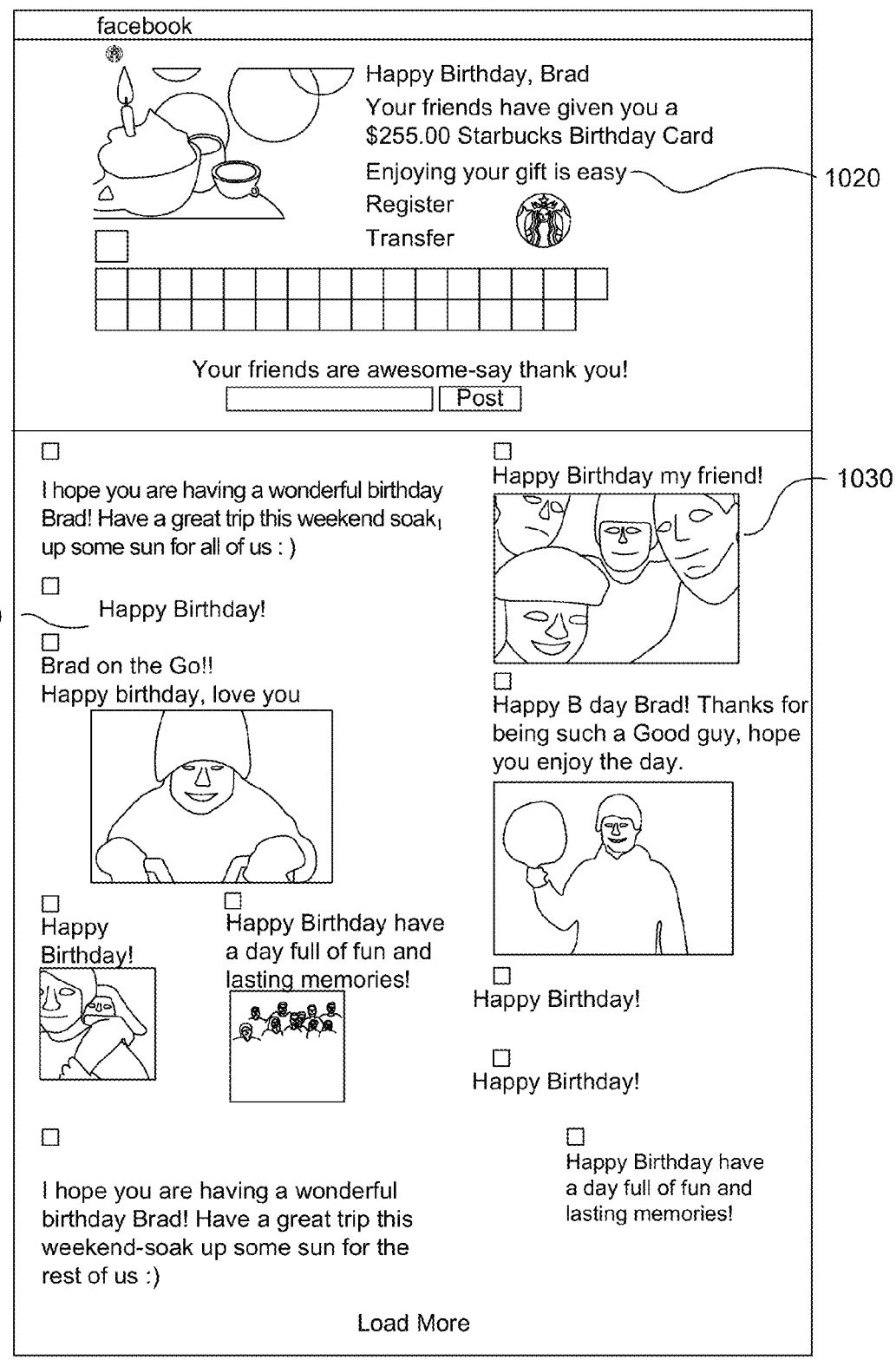
FIG. 10 shows a screenshot of a user interface presenting the target user with messages and/or gifts provided by friends of the target user at a time associated with a life event of the target user, in accordance with an embodiment of the invention.

The information included in the group gift card is provided to the target user at a time associated with the life event of the target user, for example, in the morning of a birthday. FIG. 10 shows a screenshot of a user interface presenting the target user with messages and/or gifts provided by friends of the target user at a time associated with a life event of the target user, in accordance with an embodiment of the invention. The information included may describe the financial contributions 1020 made by the friends of the target user towards the group gift card. The information provided to the user may include messages 1010, and content, for example, images uploaded by the friends of the target user for the group gift card. In some embodiments, the social networking system 100 presents the target user with alternative gifts that the target user can accept instead of a gift selected by the friends of the user. These embodiments are described herein, as follows.

Gift Arbitrage

Figure 11:
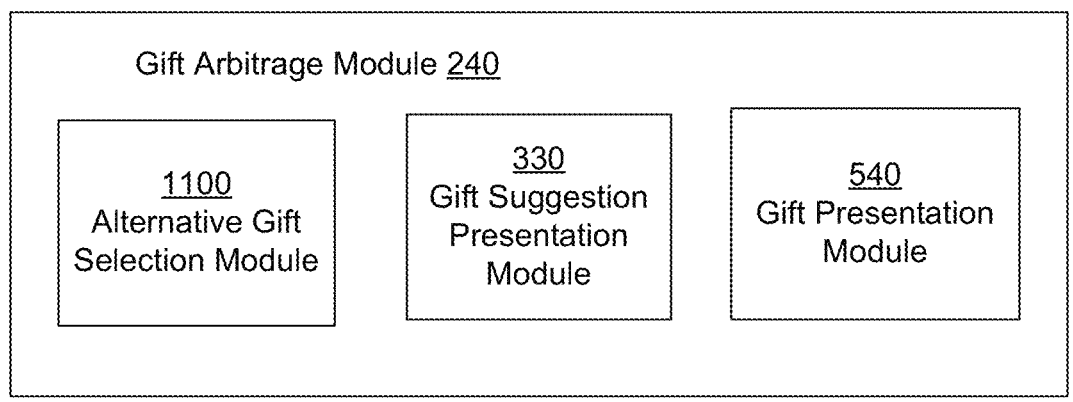
FIG. 11 provides details of the gift arbitrage module, in accordance with an embodiment of the invention.

FIG. 11 details the components of one embodiment of gift arbitrage module 240. When the gift or gifts selected by friends 145 are presented to target user 105, social networking system 100 may provide target user 105 with the opportunity to choose a different gift than that selected by friends 145. Gift alternatives 160, which are different from the gift(s) chosen by friends 145, are selected from the set of merchant bids 130 by alternative gift selection module 1100. These alternative gifts may be chosen based on the scores assigned to each bid by gift scoring module 320 and/or auction model 340, or new scores may be assigned to merchant bids 130 by sub-components of alternative gift selection module 1100.

In one embodiment of gift arbitrage module 240, alternative gifts are selected that have lower value than the value of the original gift. This allows the social networking system to receive at least a portion of the price difference between the alternative gift and the gifts selected by friends of the target user as revenue. In some embodiments, merchants 125 agree to pay the social networking system 100 revenue, for example, a fixed amount or percentage of product value for presenting the product as an alternative gift during gift arbitrage. Because there is a high likelihood of target user 105 selecting one of the alternatives presented, merchants are likely to receive a high rate of return on any items displayed during arbitrage. Therefore, in an embodiment, the social networking system 100 requires a merchant to provide higher bid values for presenting the products as alternative gifts to the target user as compared to a corresponding bid for the same product for presenting to friends of the target user as gift suggestions. The bid value for presenting the products as alternative gifts to a target user is also higher than a corresponding bid for presentation of the product as a conventional advertisement to users of the social networking system. In addition to or in place of an advertising fee, the merchant may agree to pay the social networking system a share of revenue based on the cost difference between the original gift and alternative gifts, either as a fixed amount or percentage of the cost difference.

For example, friends of target user E may give him gift F, with a value of $100. During arbitrage, social networking system 100 provides target user E with the choice to accept gift F or choose alternative gifts G, H, or I instead. In one embodiment of gift arbitrage module 240, gifts G, H, and I would necessarily have a lower value than gift F, such as $90, $80, and $70, respectively. The social networking system 100 may select gifts G, H, and I so as to maximize the revenue earned by the social networking system 100. That is, for the said gift values, social networking system 100 might predict that gift I would be most desirable to target user E, gift H would be slightly less desirable, and gift G would be less desirable than H. The complete set of possible gifts may include another gift J with value $95 that target user E is predicted to desire more than any of gifts G, H, or I as represented by the score assigned to gift J by gift scoring module 320, but the revenue difference may outweigh the difference in target user E's expected desires. If target user E selects one of gifts G, H, or I in place of gift F, such as gift H, the difference in cost ($20 in this case) may be revenue for social networking system 100.

As an example of an alternative embodiment, gift J, gift K, and gift L may be shown as alternatives to gift F, still with value $100 for this example, but the values of gifts J, K, and L are not constrained by the value of gift F and therefore might be, respectively, $120, $75, and $200. For example, gifts K, L, and M are all items sold by merchant N, although the products selected and displayed by gift arbitrage module 240 are not constrained to one merchant. Merchant N may agree to pay the social networking system an advertising fee for displaying gifts K, L, and M during arbitrage, such as $10 per item. In addition to or in place of this advertising fee, merchant N may agree to give the social networking system as revenue share a specified percentage of the value of the chosen item, a specified percentage of the price difference between the chosen item and the original gift (that is, gift F), or a fixed amount per transaction. For example, if target user E decides to purchase gift M instead of gift F, merchant N may agree to pay the social networking system ten percent of the cost difference, such that the social networking system would earn $10 from the transaction.

Gift alternatives 160 and the original gift 150 are displayed to target user 105 by gift suggestion presentation module 330, or an alternative module with features designed specifically for gift arbitrage. For example, the gift suggestion presentation module may not display the value of each item to target user 105, or in the case of an alternative gift that is more expensive than the original gift, gift suggestion presentation module 330 may only display the difference in price that target user 105 would need to pay in order to purchase the more expensive item.

Figure 12:
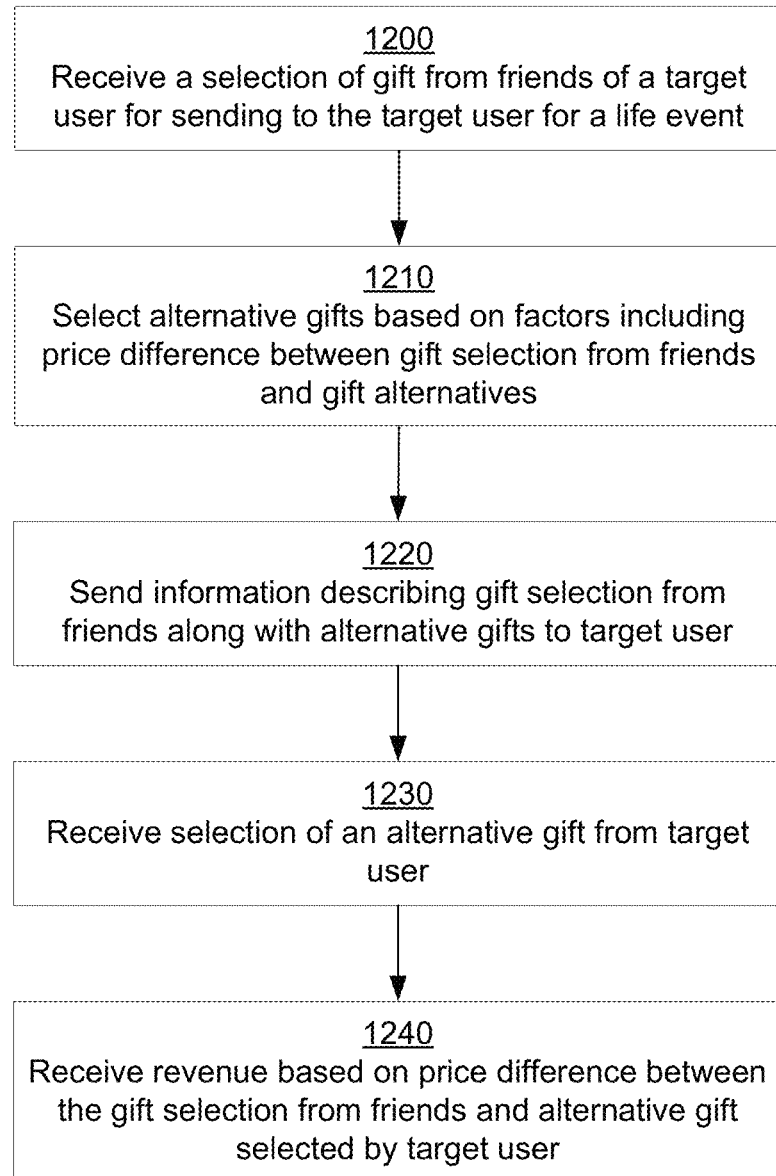
FIG. 12 is a flowchart describing the gift arbitrage process, in accordance with an embodiment of the invention.

FIG. 12 is a flowchart outlining the procedure employed by one embodiment of gift arbitrage module 240, as detailed in the description of the sub-modules. The social networking system 100 receives 1200 selection of gifts from friends of a target user for presenting to the target user for a life event. The social networking system selects 1210 alternative gifts for suggesting to the user based on various factors including price difference between the gift selection received from friends of the target user and potential alternative gifts. Other factors considered by the social networking system for selecting 1210 alternative gifts include matching of the potential alternative gifts with interests of the target user as determined by social information describing the target user stored in the social networking system, and bids provided by the merchants for presenting the products as alternative gifts. The gift suggestion presentation module 330 sends 1220 information describing the gift selections from friends of the target user along with information describing alternative gifts to the target user.

If the target user selects an alternative gift, the social networking system 100 receives 1230 the selection of the alternative gift from the target user. If social networking system may assist the merchant system that provides the alternative gift to complete a transaction for providing the alternative gift to the target user. The social networking system 100 receives revenue based at least on the price difference between the gift selection provided by the friends, and the alternative gift selected by the target user. The social networking system 100 may in addition receive revenue from merchants for each alternative gift that was presented to the target user.

Alternative Embodiments

While various embodiments and modules for implementing those embodiments have been described above, these descriptions are intended to be illustrative but not limiting of the scope of the present invention. Those of skill in the art will appreciate that the invention may be practiced in other embodiments. The particular naming of the components, capitalization of terms, the attributes, data structures, or any other programming or structural aspect is not mandatory nor significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may be instead performed by a single component.

The present invention also relates to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, such as, but not limited to, any type of disk including floppy disks, optical disks, CD-ROMs, magnetic-optical disks, read-only memories (ROM), random-access memories (RAM), EPROMs, EEPROMs, magnetic or optical cards, application specific integrated circuits (ASICs), or any type of media suitable for storing electronic instructions, and each coupled to a computer system bus. Furthermore, any computing systems referred to in the specification may include a single processor or may be architectures employing multiple processor designs for increased computing capability.

The present invention is well suited to a wide variety of computer network systems over numerous topologies. Within this field, the configuration and management of large networks comprise storage devices and computers that are communicatively coupled to dissimilar computers and storage devices over a network, such as the Internet. In addition, the present invention is not limited to any particular programming language. It is appreciated that a variety of programming languages may be used to implement the teachings of the present invention as described herein.

Finally, it should be understood that the language used in this specification has been selected for readability and instructional purposes, and may not have been selected to delineate or circumscribe the inventive subject matter. The scope of the invention is set forth in the following claims.

What is claimed is:

1. A computer implemented method comprising:
identifying a life event of a target user of a social networking system;
prompting other users of the social networking system to provide messages for delivery to the target user for the life event of the target user;
receiving, by the social networking system, a plurality of electronic messages from the other users, the electronic messages received at different times;
determining a proposed delivery time for the plurality of electronic messages for the life event;
sending information describing the proposed delivery time to one or more other users connected to the target user via the social networking system;
adjusting the proposed delivery time based on feedback received from the one or more other users;
storing the received electronic messages prior to the adjusted delivery time; and
responsive to reaching the adjusted delivery time, delivering the plurality of electronic messages for presentation to the target user.

2. The computer implemented method of claim 1, wherein the prompted users have a connection to the target user through the social networking system.

3. The computer implemented method of claim 1, wherein the proposed delivery time is determined based on the life event.

4. The computer implemented method of claim 3, wherein the proposed delivery time is determined to be substantially close to the midnight that starts a day of the life event.

5. The computer implemented method of claim 1, wherein the proposed delivery time is determined based on information received from one or more other users connected to the target user via the social networking system.

6. The computer implemented method of claim 1, wherein adjusting the proposed delivery time based on feedback received from the one or more other users comprises changing the proposed delivery time responsive to the feedback indicating more than a threshold number of users disapprove of the proposed delivery time.

7. The computer implemented method of claim 1, wherein the plurality of electronic messages include information describing a gift to the target user for the life event.

8. The computer implemented method of claim 7, wherein delivering the plurality of electronic messages further comprises sending information for redeeming the gift.

9. The computer implemented method of claim 1, wherein each of the plurality of electronic messages is received from another user connected to the target user via the social networking system.

10. A computer implemented method comprising:
identifying a life event of a target user of a social networking system;
receiving, by a social networking system, a plurality of electronic messages, each electronic message for delivery to the target user for the life event of the target user, the electronic messages received at different times;
determining a proposed delivery time for the plurality of electronic messages for the life event;
sending information describing the proposed delivery time to one or more other users connected to the target user via the social networking system;
adjusting the proposed delivery time based on feedback received from the one or more other users;
storing the received electronic messages prior to the adjusted delivery time; and
responsive to reaching the adjusted delivery time, delivering the plurality of electronic messages for presentation to the target user.

11. The computer implemented method of claim 10, further comprising:
sending information describing the messages for the life event of the target user to one or more other users connected to the target user via the social networking time at a time prior to the proposed delivery time.

12. The computer implemented method of claim 10, wherein the proposed delivery time is determined based on the life event.

13. The computer implemented method of claim 12, wherein the proposed delivery time is determined to be substantially close to the midnight that starts a day of the life event.

14. The computer implemented method of claim 10, wherein the proposed delivery time is determined based on information received from one or more other users connected to the target user via the social networking system.

15. The computer implemented method of claim 10, wherein adjusting the proposed delivery time based on feedback received from the one or more other users comprises changing the proposed delivery time responsive to the feedback indicating more than a threshold users disapprove of the proposed delivery time.

16. The computer implemented method of claim 10, wherein the plurality of electronic messages include information describing a gift to the target user for the life event.

17. The computer implemented method of claim 16, wherein delivering the plurality of electronic messages further comprises sending information for redeeming the gift.

18. The computer implemented method of claim 10, wherein each of the plurality of electronic messages is received from another user connected to the target user via the social networking system.

19. A non-transitory computer-readable storage medium storing executable computer program instructions, the computer program instructions comprising instructions for:
identifying a life event of a target user of a social networking system;
receiving, by a social networking system, a plurality of electronic messages, each electronic message for delivery to the target user for the life event of the target user, the electronic messages received at different times;
determining a proposed delivery time for the plurality of electronic messages for the life event;
sending information describing the proposed delivery time to one or more other users connected to the target user via the social networking system;
adjusting the proposed delivery time based on feedback received from the one or more other users;
storing the received electronic messages prior to the adjusted delivery time; and
responsive to reaching the delivery time of the life event, delivering the plurality of electronic messages for presentation to the target user.

20. The non-transitory computer-readable storage medium of claim 19, the instructions further comprising instructions for:
sending information describing the messages for the life event of the target user to one or more other users connected to the target user via the social networking time at a time prior to the proposed delivery time.

21. The non-transitory computer-readable storage medium of claim 19, wherein the proposed delivery time is determined based on the life event.

22. The non-transitory computer-readable storage medium of claim 21, wherein the proposed delivery time is determined to be substantially close to the midnight that starts a day of the life event.

23. The non-transitory computer-readable storage medium of claim 19, wherein the proposed delivery time is determined based on information received from one or more other users connected to the target user via the social networking system.

24. The non-transitory computer-readable storage medium of claim 19, wherein adjusting the proposed delivery time based on feedback received from the one or more other users comprises changing the proposed delivery time responsive to the feedback indicating more than a threshold users disapprove of the proposed delivery time.

25. The non-transitory computer-readable storage medium of claim 19, wherein the plurality of electronic messages include information describing a gift to the target user for the life event.

26. The non-transitory computer-readable storage medium of claim 25, wherein delivering the plurality of electronic messages further comprises sending information for redeeming the gift.

27. The non-transitory computer-readable storage medium of claim 19, wherein each of the plurality of electronic messages is received from another user connected to the target user via the social networking system.

* * * * *